March 15, 1960   S. L. BURGWIN ET AL   2,928,281
SENSITIVE INSTRUMENT

Filed May 26, 1958   2 Sheets-Sheet 1

STEPHEN L. BURGWIN  INVENTORS
BERNARD M. GALE
LAWRENCE E. GOODMAN
BY
ATTORNEY

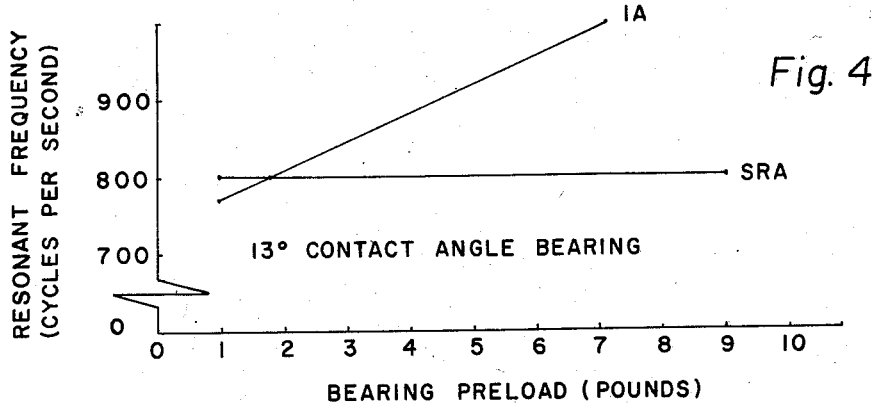
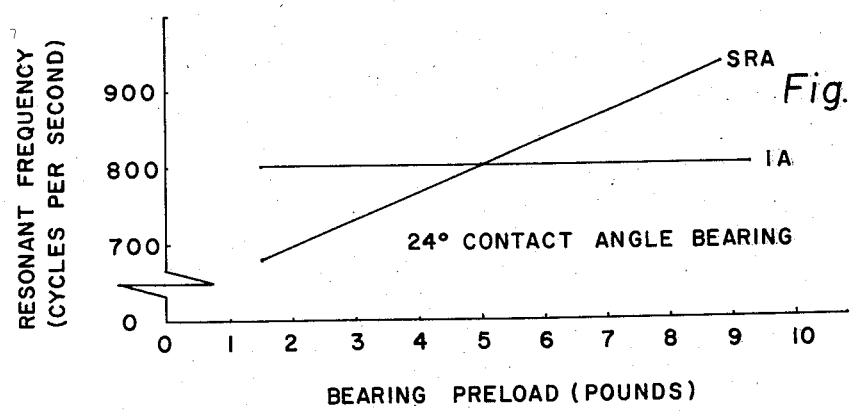
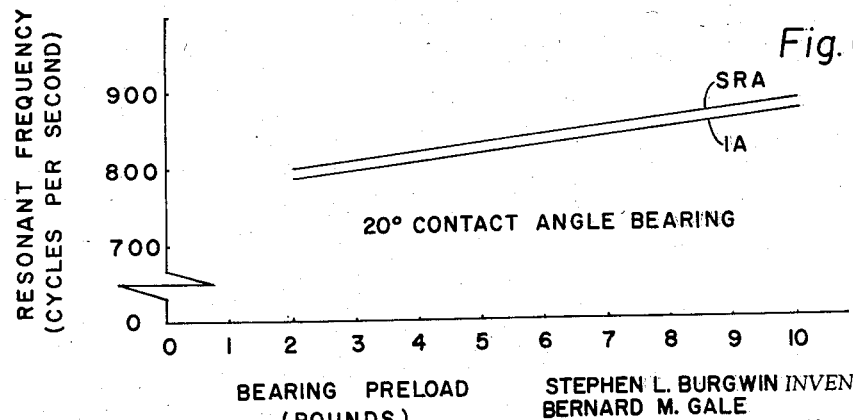

United States Patent Office 2,928,281
Patented Mar. 15, 1960

2,928,281

SENSITIVE INSTRUMENT

Stephen L. Burgwin and Bernard M. Gale, Clearwater, Fla., and Lawrence E. Goodman, St. Paul, Minn., assignors to Minneapolis-Honeywell Regulator Company, Minneapolis, Minn., a corporation of Delaware Application May 26, 1958, Serial No. 737,633

14 Claims. (Cl. 74—5)

The present invention relates to an improvement in sensitive instruments such as gyroscopes and has specific, although not exclusive application to the field of floated gyroscopes. Floated gyroscopes are becoming more and more widely used at the present time and generally comprise a hermetically sealed gimbal assembly containing a gyro spin motor having a rotor portion adapted to spin about a spin reference axis (SRA) with the gimbal assembly in turn being positioned with delicate bearings mounted in a housing member for rotation about an output axis (OA) which is perpendicular to the SRA. The gimbal assembly is floated inside the housing in a viscous damping fluid having a density the same as the effective density of the gimbal assembly so that the gimbal is buoyed up in substantial neutral suspension thus placing little direct loading on the delicate bearings. Each gyro has an input axis (IA) which is perpendicular to both the OA and SRA and movement or rotation of the entire gyroscope about the IA results in precession or a tendency to precess of the gimbal assembly about the OA.

Floated gyros are in widespread use because they are both rugged and extremely accurate. Their ruggedness derives from the support of the gimbal assembly by the fluid which serves to protect the gimbal bearings from mechanical shocks. The extreme accuracy is derived in part from the practically frictionless positioning of the gimbal by the bearings which define the OA. Although extremely accurate gyros are being manufactured at the present time, requirements of inertial navigation systems and other applications are becoming increasingly exacting and consequently further reduction in gyro drift torque has become mandatory. Gyro drift torque is defined as any unwanted or spurious torque that is produced tending to rotate the gimbal about its output axis.

The present invention specifically relates to a means for reducing the type of gyro drift torque known in the art as "anisoelastic torque." Anisoelastic torque is caused by a relative flexing or movement between the center of mass of the gimbal assembly and its center of buoyancy under conditions of acceleration. By far the largest part of the anisoelastic torque is due to the motion of the spin motor rotor center of mass relative to the gimbal center of buoyancy. The contribution of the remainder of the gimbal masses to the total anisoelastic torque is negligible in comparison to the anisoelastic torque caused by the rotor mass and hence can be neglected.

If the gyro is subjected to an acceleration along the spin reference axis, there will be a slight movement of the spin motor rotor relative to the gimbal along the spin reference axis in a direction opposite to that of the acceleration. This movement is not due to any sliding or looseness in the spin motor construction, but results from a slight deformation of the motor components such as the motor end-bell member and the spin motor bearings. These deflections will disappear when the acceleration ceases.

If, while the first acceleration is acting, a second acceleration is applied to the gyro along the input axis, the second force of acceleration now acts on a mass (the spin motor rotor mass) which is eccentric with respect to its balanced or undisturbed position, hence causing a torque. Likewise the second acceleration causes a deformation along the input axis, and the first acceleration acts to create a torque also. It turns out that the second torque is in the opposite direction to the first torque. It is therefore possible that the two torques will exactly cancel each other, which is the case when the elasticity of the means supporting the mass is equal along the spin reference axis and input axis directions. Any torque that does result is due to an unequal elasticity and is therefore identified as "anisoelastic torque."

The reason that the mass of the spin motor rotor is displaced off its normal or neutral position in response to acceleration along the input axis is that there is a deflection or deformation of the spin motor shaft and bearings.

When a gyroscope is subjected to a sinusoidal acceleration the anisoelastic torque coefficient (T) may be calculated from the following formula:

$$T = \frac{M^2 A^2}{4}(K_1 - K_2) \sin 2\alpha$$

Where:

M is the mass of the gyro motor rotor.

$K_1$ is the summation of all of the compliances between the center of mass of the motor rotor and the center of buoyancy of the gimbal to acceleration along the IA.

$K_2$ is the summation of all of the compliances between the center of mass of the motor rotor and the center of buoyancy of the gimbal to acceleration along the SRA.

A is the magnitude of the peak sinusoidal acceleration to which the gyro is subjected.

$\alpha$ is the angle in the plane defined by the IA and SRA between the direction of the applied acceleration and the input axis of the gyro.

It will be noted from the above formula that the anisoelastic torque coefficient increases as the square of the mass of the motor rotor and also is proportional to the square of the exciting acceleration. The formula also illustrates how the drift torque increases in proportion to the difference between the compliance in the SRA direction and the compliance in the IA direction. The term "compliance" as used herein means the amount of deflection of a member for a unit amount of force being applied and also may be expressed as the reciprocal of stiffness. The formula also indicates that the anisoelastic torque coefficient is largest when the external vibration or exciting acceleration has equal components along the IA and SRA or in other words when $\alpha$ equals 45° and is smallest when the exciting acceleration is directed parallel to either the IA or SRA.

One prior art method of reducing the anisoelastic torque coefficient of the gyroscope is shown in the J. M. Slater et al. Patent 2,649,808 dated January 25, 1953 wherein the axial force or preload on the spin motor bearings is adjusted during the construction of the spin motor until a certain contact angle is reached. This patent teaches that for a given gyro design there is a certain contact angle wherein the axial and radial deflections of the bearings due to acceleration are equal to each other.

The contact angle of a bearing is the angle measured between a plane perpendicular to the axis of rotation of the bearings and a line joining the points of tangency of the bearings in the races.

The prior art technique taught by Slater et al. for minimizing anisoelastic torque is unsatisfactory for two reasons. First of all it is impossible to obtain on a production basis a uniform amount of preload on the bearings to required accuracy. Secondly, the bearing preload changes during the life of the gyro. Simply stated the bearings of the spin motor will wear a predictable amount as the gyro is used and as the bearings wear the amount of preloading will change. When this happens the teaching of the invention of Slater et al. is destroyed and there will be resulting anisoelastic torque produced in the gyro when it is subjected to acceleration.

The present invention is concerned with providing a gyroscope apparatus that has negligible anisoelastic torque characteristics in response to acceleration regardless of substantial variations in the preload on the spin motor bearings. The present invention is based upon the discovery that for a given bearing design there is a critical contact angle between the ball bearings and the inner and outer races of a preloaded pair of bearings for which there is a constant difference between the compliances in the axial and radial directions over a substantial range of preload values. The present invention further contemplates the combination of bearings having this critical contact angle together with a proper design of the spin motor bearings support means so that the compliances of the support means compensate for the constant difference in bearing axial and radial compliances, the end result being a gyro wherein the rotor has substantially equal compliance in the radial and axial directions over a substantial variation in the bearing preload values with the resulting reduction to a minimum of the anisoelastic torque coefficient.

It is an object of this invention therefore to produce an improved gyroscopic apparatus.

A further object of the invention is to provide a gyroscopic apparatus wherein anisoelastic torque is reduced to a minimum.

Other and more specific objects of the invention will be set forth more fully in and become apparent from a reading of the following specification and appended claims, in conjunction with the accompanying drawing in which:

Figures 4, 5, and 6 are graphs showing the relationship between bearing preload and resonant frequency of gyro gimbal assemblies in response to acceleration along the IA and SRA for spin motor bearings having contact angles of 13°, 24° and 20° respectively.

Figure 1:
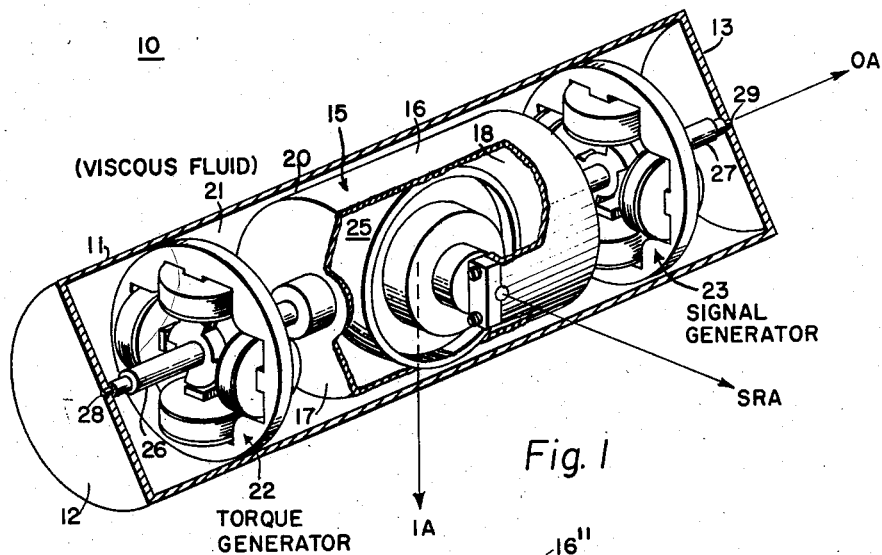
Figure 1 is an isometric view, partly in section, of a floated gyro.

Referring to Figure 1, numeral 10 generally depicts a floated gyroscope comprising a housing member 11 which is generally an elongated cylindrical member having end portions 12 and 13. A gimbal assembly 15 is positioned with housing 11 and generally comprises a cylindrical gimbal member 16 having end portions 17 and 18, the outside diameter of the cylindrical portion 16 being slightly less than the inside diameter of the housing 11, a narrow gap 20 being defined between the outer housing 11 and the gimbal assembly 15.

Figure 2:
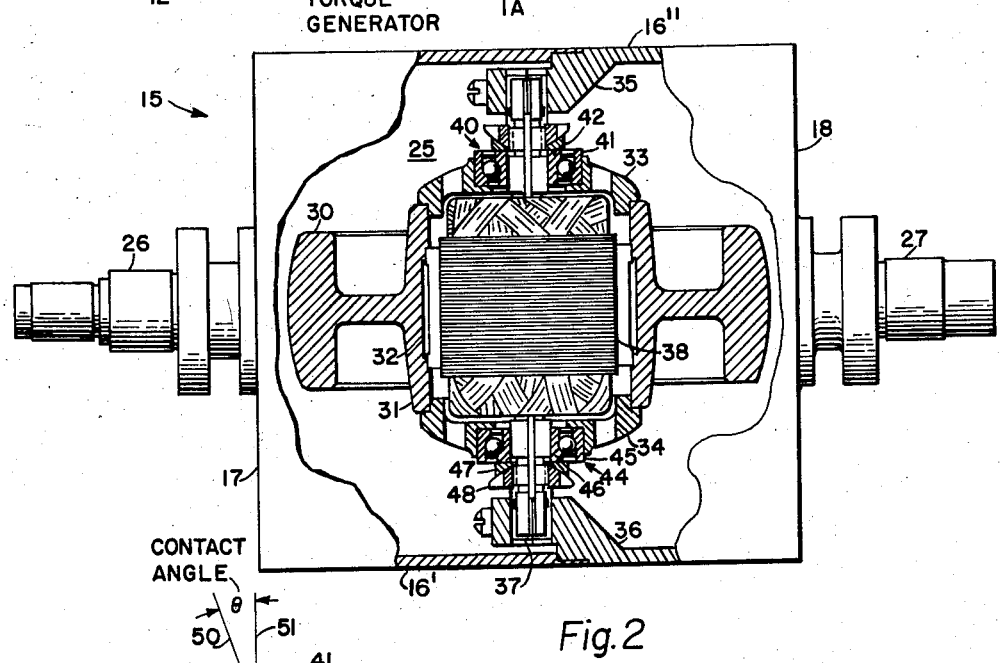
Figure 2 is a view, partly in section, of a gimbal assembly including a spin motor of a gyro.

The gimbal assembly 15 is hermetically sealed and positioned within is a gyro spin motor generally depicted by the reference numeral 25 and shown in greater detail in Figure 2.

A pair of shaft portions 26 and 27 extend from end portions 17 and 18 respectively of the gimbal assembly 15 and terminate in bearing portions 28 and 29 respectively which cooperate with delicate bearings (not shown) in the end walls 12 and 13 of the outer housing 11 which define an output axis (OA) about which the gimbal assembly 15 may rotate relative to the outer housing 11.

The spin motor has a rotor portion 30 adapted to rotate about an axis identified as a spin reference axis (SRA) and the spin motor assembly is mounted so that the SRA is perpendicular to the OA. The axis which is perpendicular to both the OA and the SRA is the gyro input axis (IA). Rotation of the gyro assembly 10 about the input axis will result in precession or a tendency to precession of the gimbal assembly 15 about the output axis OA.

A viscous fluid 21 is provided inside of housing 11 and is selected so as to be of substantially the same density as the effective density of the gimbal assembly 15 so as to support substantially all of the weight of the gimbal assembly 15. The viscous fluid 21 is disposed in the gap 20 and as is well understood by those skilled in the art provides damping and integrating functions.

A torque generator 22 and a signal generator 23 are provided and comprise stator portions which are mounted within the housing 11 and rotor portions which are mounted on shafts 26 and 27 respectively. Torque generator 22 and signal generator 23 are shown because such means are customarily part of floated gyros although they form no direct part of the present invention.

In Figure 2 it will be seen that the gimbal assembly is constructed out of two cup-shaped portions 16' and 16" which fit tightly together so as to form a continuous cylindrical outer surface. Cup member 16" has inwardly extending motor mount members 35 and 36 to which is securely fastened a stator shaft member 37. Centrally positioned on the motor shaft 37 are the laminations and windings associated with the stator 38 of the spin motor 25.

The rotor member 30 has a central hub portion 31 in which is mounted a suitable member such as a hysteresis ring 32 which coacts with the flux field developed by the stator 38 so as to impart a rotation to the rotor 30. A pair of end-bell members 33 and 34 are pressed into the ends of the hub portion 31 and have suitable recesses therein for receiving the outer races 41 and 45 of spin motor bearings 40 and 44 respectively. The inner races 42 and 46 of bearings 40 and 44 are in turn mounted on the stator shaft 37 and a plurality of ball bearings are symmetrically disposed between the inner and outer races of the bearings 40 and 44. Means are provided for adjusting the preload on the ball bearings and comprise a pressure washer 47 which contacts the inner races of the bearings on the outer axial face thereof and which has a dished face on the other end thereof which meets with a threaded nut member 48 which is mounted on the stator shaft 37. Each of the bearings 40 and 44 has this type of adjustment and it will be appreciated that rotation of nut members 48 relative to the shaft 37 will tend to shift the inner races 42 and 46 of the bearings 40 and 44 relative to the outer races 41 and 45. Since the outer races 41 and 45 are constrained against axial movement by the end-bell members 33 and 34, it follows that rotation of the nut members 48 will vary the amount of loading on the balls in the bearings.

Figure 3:
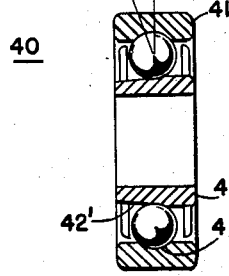
Figure 3 is a cross sectional view of a bearing for the spin motor shown in Figure 2.

Bearings 40 and 44 are identical to one another and form a bearing pair for the spin motor 25. In Figure 3 an enlarged view of bearing 40 is shown. The outer surface of the inner race 42 is generally tapered as at 42'. At the point where the inner race 42 contacts the individual ball bearings, the surface 42' is curved with the radius of curvature being somewhat greater than the radius of the individual ball bearings. The inner surface of the outer race 41 of bearing 40 has a generally curved recess 41' therein adapted to receive one side of the individual ball bearings. Bearing 40 is shown in Figure 3 to have a contact angle $\theta$. As indicated above, the contact angle is the angle measured between a plane which is perpendicular to the axis of rotation of the bearings and a line joining the points of tangency of the ball and the races. Thus in Figure 3 the plane perpendicular to the rotational axis is represented by line 51 and the line joining the points of tangency is indicated by reference numeral 50 where the contact angle $\theta$ is the angle subtended by lines 50 and 51.

In Figure 4 data are presented which demonstrates the anisoelastic properties of a spin motor assembly having bearings with a 13° contact angle as a function of bearing preload. The abscissa represents bearing preload measured in pounds and the ordinate represents resonant frequency and is measured in cycles per second. The resonant frequency $F_0$ is represented by the formula:

$$F_0 = \frac{1}{2\pi}\sqrt{\frac{1}{KM}}$$

Where:

K is the compliance of the motor assembly to acceleration in the direction of the applied acceleration and M is the mass of the gyro motor.

It will be noted that the resonant frequency $F_0$ is a function of the compliance of the motor assembly. In Figure 4 therefore the relationship in a sense is that of the variation of motor assembly compliance as a function of bearing preload. It has previously been demonstrated that the motor assembly compliance is the determining factor for anisoelastic torque.

Two curves are plotted in Figure 4, the first being response or variation in resonant frequency as a function of bearing preload for acceleration along the input axis. This curve is labeled IA. The second curve is the variation in resonant frequency as a function of bearing preload for acceleration along the spin reference axis. This curve is identified as SRA. It will be noted that the two curves IA and SRA intersect at a resonant frequency of 800 cycles and a bearing preload of approximately 1.75 pounds.

According to the prior art technique of eliminating anisoelastic torque during the manufacture of the gyro an attempt would be made to adjust the preload on the bearings to 1.75 pounds, this being the point where the SRA and IA curves intersect and where the anisoelastic torque would be at a minimum. However, as pointed out above, it is very difficult to adjust the preload to any set point on a production basis without expending a large effort and further the bearing preload tends to shift during the life of the gyro because as the spin motor is run there is bound to be a certain amount of wear between the ball bearings and the inner and outer races and this wear will cause the preload to change. It will be appreciated that as the preload changes (with reference to Figure 4) the interrelated quantities of resonant frequency, compliance, and anisoelastic torque all will depart from their preset values. The anisoelastic torque would increase since, of course, the original attempt to adjust preload would have been to adjust its value to zero.

In Figure 5 the same type of curves are shown for a 24° contact angle bearing and it will be noted here that the SRA curve and the IA curve intersect at a point corresponding to approximately 5 pounds bearing preload and 800 cycles resonant frequency. Again any deviation away from the 5 pounds bearing preload caused by inaccuracy in manufacturing and/or wear of the bearings during the life of the gyro will result in anisoelastic torque with a corresponding source of error in the gyro.

In Figure 6 there is shown corresponding curves for a 20° contact angle bearing which, for a gyro of the type shown in Figures 1 and 2, produces an optimum result wherein the variation of resonant frequency as a function of bearing preload is similar in both the SRA and IA directions. In Figure 6 it will be noted that the SRA curve and the IA curve are substantially parallel to one another over a considerable portion of the range of bearing preload. It has already been demonstrated that there is a correlation between the resonant frequency and compliance so it follows that the data presented in Figure 6 may be interpreted as showing that the spin motor assembly has a substantially constant difference in compliance over a substantial variation in bearing preload in the input axis and spin reference axis directions.

The present invention is based upon the discovery that by varying the contact angle of a bearing pair a point will be reached where there will be a constant difference of compliance in the radial and axial directions over a considerable range of preload. Thus far it has been found that using ASME52100 Chrome steel and 57% curvature (the ratio of the radius of curvature of the curved portion of outer surface 42' of the inner race 42 of the bearings to the diameter of the individual ball bearings) for the ball bearings, that a 20° contact angle is the optimum contact angle.

The present invention further includes designing the remaining portions of the gyro which contribute to the support of the rotor so that the summation of all of the compliances thereof (including the bearing compliance) in the input axis direction is substantially equal to the summation of all of the compliances in the SRA direction over a considerable or substantial range of bearing loading. Ideally, the SRA curve should be superimposed on the IA curve in Figure 6 which would be a condition of zero anisoelasticity. For this condition it will be appreciated that regardless of considerable shifting in bearing preload there will be no change in the anisoelastic torque coefficient.

Various methods are available for evaluating or analyzing the compliances of the spin motor. One method that has been used successfully is to subject the motor to accelerations for varying frequencies, first applying the accelerations along the IA and then applying the accelerations along the SRA. Then, using means for measuring resonance such as sonic means, the frequencies at which the motor resonates can be accurately determined. The resonant frequency $F_0$ may then be used in the determination of the compliance K according to the formula:

$$F_0 = \frac{1}{2\pi}\sqrt{\frac{1}{KM}}$$

Since the resonant frequency has been observed and the mass M is known, then the value of the compliance K may be readily calculated. The compliance of the motor to acceleration in the IA direction is compared to the compliance of the motor to acceleration in the SRA direction. This analysis is continued by introducing another variable, namely variation in bearing preload. In the final analysis, if the optimum contact angle has been obtained and if the compliances of the remaining elements of the gyroscope which contribute to the shifting of the rotor center of mass had been properly designed, then the resonant frequency of the device for acceleration in the IA direction and in the SRA direction will be substantially equal at any particular value of bearing preload over a substantial variation in bearing preload.

While we have shown and described a specific embodiment of this invention, further improvement may well occur to those skilled in the art. We desire it to be understood, therefore, that this invention is not limited to the particular form shown and we intend in the appended claims to cover all modifications which do not depart from the spirit and scope of this invention.

What we claim is:

1. A gyroscope having input, output and spin reference axes arranged at right angles to one another and comprising a gimbal supported for rotation about said output axis, a motor stator member including a shaft member connected to said gimbal, a rotor member, and bearing means connected to said shaft member and said rotor for rotatably supporting said rotor for rotation about said spin reference axis, said bearing means having a substantially constant difference in compliance thereof in the input axis and spin reference axis directions throughout a substantial range of bearing loading and said gimbal and said shaft member having compliances in the input axis and spin reference axis directions of a magnitude selected so that the summation of the compliances of said bearing means, said gimbal, and said shaft member in the input axis direction is substantially equal to the summation of the compliances of said bearing means, said gimbal and said shaft member in the spin reference axis direction throughout a substantial range of bearing loading so that said gyroscope will have a low anisoelastic torque coefficient.

2. A gyroscope having an input axis, an output axis, and a spin reference axis comprising a rotor, bearing means at each end of said rotor having a constant difference in the compliance thereof in the input axis and spin reference axis directions throughout a substantial range of bearing loading, and relatively stationary means supporting said rotor through said bearing means, said stationary means having compliances in the input axis and spin reference axis directions of a magnitude selected so that the summation of the compliances of said bearing means and said stationary means in the input axis direction is substantially equal to the summation of the compliances of said bearing means and said stationary means in the spin reference axis direction throughout a substantial range of bearing loading so that said gyroscope will have a low anisoelastic torque coefficient.

3. A gyroscope having input, output, and spin reference axes at mutual right angles and comprising a rotor, ball bearing means at each end of said rotor having a substantially constant difference in the compliance thereof to acceleration in the input axis and spin reference axis directions throughout a substantial range of bearing loading, and means supporting said rotor through said bearing means, said supporting means having compliances in the input axis and spin reference axis directions of a magnitude selected so that the summation of the compliances of said bearing means and said supporting means in the input axis direction is substantially equal to the summation of the compliances of said bearing means and said supporting means in the spin reference axis direction throughout a substantial range of bearing loading so that said gyroscope will have a low anisoelastic torque coefficient.

4. A floated gyroscope having input, output, and spin reference axes at mutual right angles comprising a rotor, ball bearing means connected to said rotor and having a constant difference in the compliance thereof in the input axis and spin axis directions throughout a substantial range of bearing loadinng, and means including a floated gimbal supporting said rotor through said bearing means, said supporting means having compliances in the input axis and spin reference directions of a magnitude selected so that the summation of the compliances of said bearing means and said supporting means in the input axis direction is substantially equal to the summation of the compliances of said bearing means and said supporting means in the spin reference axis direction throughout a substantial range of bearing loading so that said gyroscope will have a low anisoelastic torque coefficient.

5. A gyroscope having an input axis, an output axis, and a spin reference axis comprising a rotor, ball bearing means at each end of said rotor having a substantially constant difference in the compliance thereof in the input axis and spin axis directions throughout a substantial range of bearing loading, and means including gimbal means supporting said rotor through said bearing means, said supporting means having compliances in the input axis and spin reference directions of a magnitude selected so that the summation of the compliances of said bearing means and said supporting means in the input axis direction is substantially equal to the summation of the compliances of said bearing means and said supporting means in the spin reference axis direction throughout a substantial range of bearing loading so that said gyroscope will have a low anisoelastic torque coefficient.

6. A gyroscope having input, output, and spin reference axes comprising a rotor, ball bearing means at each end of said rotor having inner and outer races contacting ball bearings positioned therebetween at a contact angle selected so that the bearing means has a constant difference in compliance in the input axis and spin reference axis directions throughout a substantial range of bearing loading, and means supporting said bearing means, said supporting means having compliances in the input axis and spin reference axis directions of a magnitude selected so that the summation of the compliances of said bearing means and said supporting means in the input axis direction is substantially equal to the summation of the compliances of said bearing means and said supporting means in the spin reference axis direction throughout a substantial range of bearing loading so that said gyroscope will have a low anisoelastic torque coefficient.

7. A gyroscope having input, output and spin reference axes arranged at right angles to one another and comprising a gimbal supported for rotation about said output axis, a motor stator member including a shaft member connected to said gimbal, a rotor member, and bearing means including an inner race, an outer race, and ball bearings connected to said shaft member and said rotor for rotatably supporting said rotor for rotation about said spin reference axis, said races of said bearing means contacting said ball bearings at a contact angle selected so that there is a substantially constant difference in compliance of said bearing means in the input axis and spin reference axis directions throughout a substantial range of bearing loading, and said gimbal and said shaft having compliances in the input axis and spin reference axis directions of a magnitude selected so that the summation of the compliances of said bearing means, said gimbal, and said shaft in the input axis direction is substantially equal to the summation of the compliances of said bearing means, said gimbal and said shaft in the spin reference axis direction throughout a substantial range of bearing loading so that said gyroscope will have a low anisoelastic torque coefficient.

8. A gyroscope having input, output, and spin reference axes comprising a rotor, ball bearing means at each end of said rotor having inner and outer races contacting ball bearings positioned therebetween at a contact angle selected to produce a substantially constant difference in the compliance of said bearing means in the input axis and spin axis directions throughout a substantial range of bearing loading, and means supporting said bearing means.

9. A gyroscope comprising a rotor, bearing means at each end of said rotor having a substantially constant difference in radial and axial deflection characteristics over a substantial variation of bearing loading, and means supporting said bearing means having deflection characteristics selected so that the summation of the deflection characteristics of said bearing means and said supporting means in the radial direction is substantially equal to the summation of the deflection characteristics of said bearing means and said supporting means in the axial direction over a substantial variation of bearing loading.

10. A gyroscope comprising a rotor, ball bearing means at each end of said rotor having a contact angle selected to cause a substantially constant difference in the radial and axial deflection characteristics over a substantial variation of bearing loading, and means supporting said ball bearing means having deflection characteristics selected so that the summation of the deflection characteristics of said ball bearing means and said supporting means in the radial direction is substantially equal to the summation of the deflection characteristics of said ball bearing means and said supporting means in the axial direction over a substantial variation of bearing loading.

11. In a sensitive instrument, a rotor, rotor support means and elastic bearing means for rotatably mounting said rotor on said rotor support means, said bearing means being characterized by having substantially a constant difference of compliance in the axial and radial directions over a substantial variation in bearing loading, and said rotor support means being characterized by having compliances of a magnitude selected so that the summation of the compliances of said bearing means and said rotor support means in the radial direction is substantially equal to the summation of the compliances of said bearing means and said rotor support means in the axial direction throughout a substantial range of bearing loading.

12. In a sensitive instrument, a rotor, rotor support means and elastic bearing means for rotatably mounting said rotor on said rotor support means, said bearing means being characterized by having substantially a constant difference of compliance in the axial and radial directions over a substantial variation in bearing loading.

13. In a sensitive instrument, a rotor, rotor support means, and elastic bearing means for rotatably mounting said rotor on said rotor support means, said bearing means and said support means being characterized by having a combined compliance in the axial direction equal to the combined compliance in the radial direction over a substantial range of loading of said bearing means.

14. In a sensitive instrument, a rotor, rotor support means, and a pair of ball bearings for rotatably mounting said rotor on said rotor support means, said bearings and said support means being characterized by having a combined compliance in the axial direction equal to the combined compliance in the radial direction over a substantial range of loading of said bearing means.

References Cited in the file of this patent
UNITED STATES PATENTS

| | | |
|---|---|---|
| 2,649,808 | Slater et al. | Aug. 25, 1953 |
| 2,836,981 | Karatzas et al. | June 3, 1958 |